US009201199B2

(12) United States Patent
Lin et al.

(10) Patent No.: US 9,201,199 B2
(45) Date of Patent: Dec. 1, 2015

(54) ONE-PIECE OPTICAL FIBER ADAPTER

(71) Applicants: Sung-An Lin, Miaoli County (TW); Sung-Chi Lin, Miaoli County (TW)

(72) Inventors: Sung-An Lin, Miaoli County (TW); Sung-Chi Lin, Miaoli County (TW)

( * ) Notice: Subject to any disclaimer, the term of this patent is extended or adjusted under 35 U.S.C. 154(b) by 53 days.

(21) Appl. No.: 14/231,910

(22) Filed: Apr. 1, 2014

(65) Prior Publication Data

US 2015/0192744 A1 Jul. 9, 2015

(30) Foreign Application Priority Data

Jan. 9, 2014 (TW) ............................ 103100784 A

(51) Int. Cl.
*G02B 6/38* (2006.01)

(52) U.S. Cl.
CPC .................................. *G02B 6/3807* (2013.01)

(58) Field of Classification Search
CPC .................................................. G02B 6/3807
USPC ......................................................... 385/75
See application file for complete search history.

(56) References Cited

U.S. PATENT DOCUMENTS 5,166,995 A * 11/1992 Briggs et al. .................... 385/58
6,363,199 B1 * 3/2002 Carberry et al. .............. 385/134
6,464,408 B1 * 10/2002 Nolan ............................ 385/87
8,636,422 B2 * 1/2014 Kahle et al. ..................... 385/58
8,734,027 B2 * 5/2014 Zoss et al. ....................... 385/78
2004/0072454 A1 * 4/2004 Nakajima et al. ............... 439/79
2006/0153504 A1 * 7/2006 Suzuki et al. ................... 385/71
2012/0033918 A1 * 2/2012 Jibiki et al. ..................... 385/75
2012/0195555 A1 * 8/2012 Jibiki et al. ..................... 385/75
2013/0051749 A1 * 2/2013 Lin et al. ....................... 385/134
2013/0071068 A1 * 3/2013 Lin ................................ 385/75
2014/0147082 A1 * 5/2014 Lee ................................ 385/78
2014/0205253 A1 * 7/2014 Yang et al. .................... 385/134

* cited by examiner

*Primary Examiner* — Sung Pak
(74) *Attorney, Agent, or Firm* — Rosenberg, Klein & Lee

(57) ABSTRACT

The optical fiber adapter of the present disclosure includes a main body and a pair of inner housings. The main body has a passage defined by a first wall, a second wall, a third wall and a fourth wall. The passage has opposing first and second openings in an axial direction. A first stop block is positioned on the first wall. A second stop block is positioned on the third wall. A first elastic plate and a second elastic plate are positioned within the passage. The inner housings are positioned within the passage, wherein the inner housing includes a flange and a hollow cylinder extending from the flange. The flanges of the two inner housings are attached to each other and are positioned between the first stop block and first elastic plate, and between the second stop block and second elastic plate.

14 Claims, 13 Drawing Sheets

ONE-PIECE OPTICAL FIBER ADAPTER

CROSS REFERENCE TO RELATED APPLICATION

The present application is based on and claims priority to Taiwanese Application Number 103100784, filed Jan. 9, 2014, the disclosure of which is hereby incorporated by reference herein in its entirety.

BACKGROUND

1. Technical Field

The disclosure relates to an optical fiber adapter, and more particularly, to a one-piece optical fiber adapter.

2. Description of the Related Art

Referring to FIG. 1, a conventional SC type one-piece optical fiber adapter 10 includes a main body 11. The main body 11 has an accommodation room 32 defined by a plurality of side-walls 60, wherein the accommodation room 32 is configured to receive an optical fiber connector 90. When the optical fiber connector 90 is inserted into the accommodation room 32 of the optical fiber adapter 10, a key protrusion 92 on the connector 90 will be received in a guiding slot 30 on one side-wall 60. In addition, the optical fiber adapter 10 further includes a sleeve 52 to receive a ferrule 96 of the connector 90 and a pair of hooks 54 to hook on to recesses 34 on the connector 90 when the connector 90 is mated with the adapter 10.

Referring to FIG. 2, a conventional optical fiber adapter 200 includes a first outer housing 210*a* and a second outer housing 210*b*, a first inner housing 220*a*, a second inner housing 220*b* and a sleeve 230. The first outer housing 210*a* is identical to the second outer housing 210*b* in structure and the first inner housing 220*a* is identical to the second inner housing 220*b* in structure.

Each of the outer housings 210*a*, 210*b* has a rectangular accommodation room 215 defined by four side-walls 211, 212, 213, 214, wherein the accommodation room 215 is configured to receive the optical fiber connector 90. A pair of tabs 216 is provided on the side-walls 212 and 214, respectively so as to secure the adapter 200 on a panel. In addition, two elongated protrusions 217 are formed on the side-walls 211, 213 of each the outer housings 210*a*, 210*b*, respectively, wherein the protrusions 217 are parallel to and separated for a predetermined distance from edges of the side-walls 211, 213, respectively. Each of the inner housings 220*a*, 220*b* is provided with a pair of hooks 223 extending from one surface of a generally rectangular flange 222. The flange 222 includes a hollow cylinder 221 located between the two hooks 223. The flange 222 is sized to be placed within the rectangular accommodation room 215 of the outer housing 210*a*, 210*b* and has a thickness equal to the predetermined distance from the protrusions 217 to the edges of the side-wall 211, 213.

The outer housings 210*a*, 210*b*, inner housings 220*a*, 220*b* and sleeve 230 may be assembled to form the optical fiber adapter 10 of FIG. 1. The inner housings 220*a*, 220*b* are placed within the outer housings 210*a*, 210*b*, respectively and the sleeve 230 is inserted into the cylinders 221 of the inner housings 220*a* and 220*b*. Afterward, the tabs 216 of the outer housings 210*a* and 210*b* are bonded together by ultrasonic welding so that the outer housings 210*a* and 210*b* are attached to each other.

Since the tabs 216 are ultrasonically welded together, a welding line is present on the adapter 200. Furthermore, the adapter 200 has more parts and therefore is time-consuming to assemble.

Accordingly, there exists a need to provide a solution to solve the aforesaid problems.

SUMMARY

The present disclosure provides an optical fiber adapter that has fewer parts and is simpler and easier to assemble.

In one embodiment, the optical fiber adapter of the present disclosure includes a main body and a pair of inner housings. The main body has a passage defined by a first wall, a second wall, a third wall and a fourth wall, wherein the first wall faces the third wall and connects with the second and fourth wall. The passage has opposing first and second openings in an axial direction to allow two optical fiber connectors to insert into the passage to mate with each other. A first stop block is positioned on the first wall. A second stop block is positioned on the third wall. A first elastic plate and a second elastic plate are positioned within the passage. The inner housings are positioned within the passage, wherein each of the inner housings includes a flange having opposing front and back surfaces and a hollow cylinder extending from the front surface. The flanges of the two inner housings are attached to each other and are positioned between the first stop block and first elastic plate, and between the second stop block and second elastic plate. The first, second stop blocks, and the first, second elastic plates are positioned to restrict a movement of the flanges in the axial direction. The first opening is further configured for the two inner housings to insert into the passage.

The present disclosure further provides a method of assembling the above optical fiber adapter.

The foregoing, as well as additional objects, features and advantages of the disclosure will be more readily apparent from the following detailed description, which proceeds with reference to the accompanying drawings.

BRIEF DESCRIPTION OF THE DRAWINGS

FIG. 7b is a cross-sectional view of the optical fiber adapter taken along line 5-5 in FIG. 6a.

DETAILED DESCRIPTION OF THE PREFERRED EMBODIMENT

Figure 1:
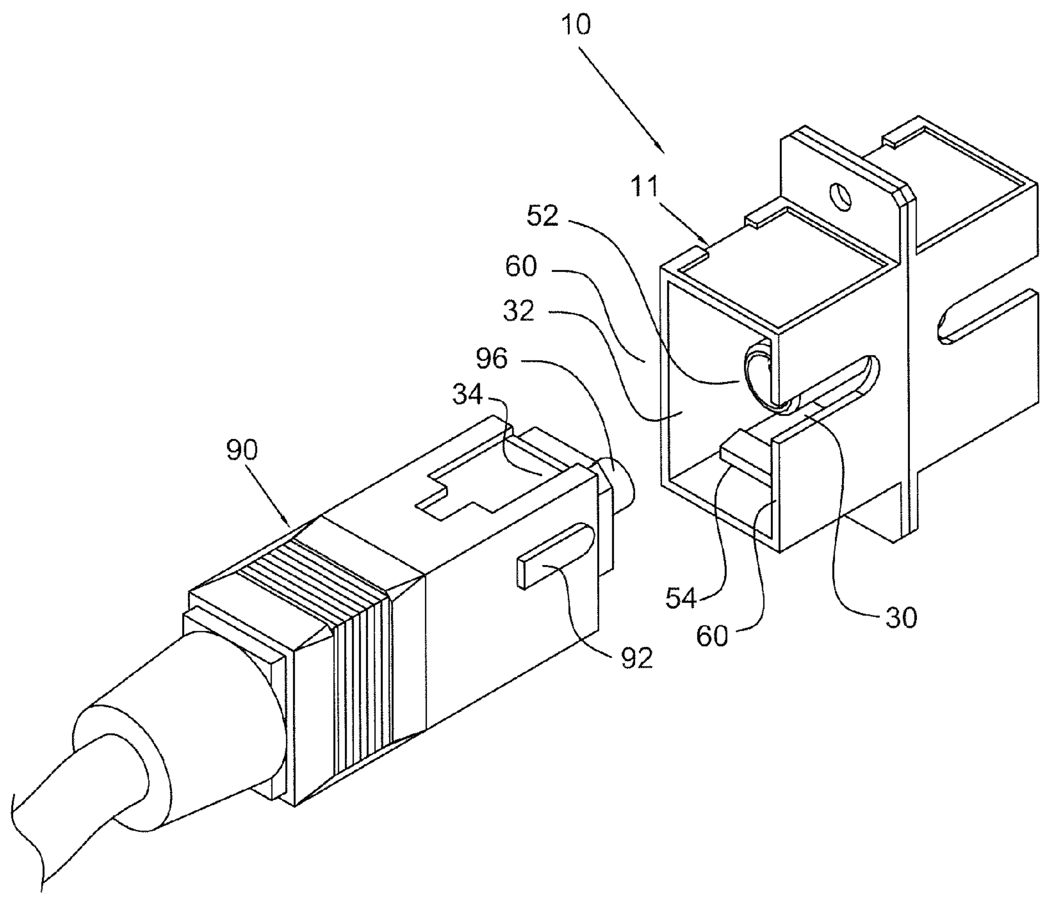
FIG. 1 is an elevated perspective view illustrating a conventional SC type optical fiber adapter and a conventional SC type optical fiber connector.
Figure 2:
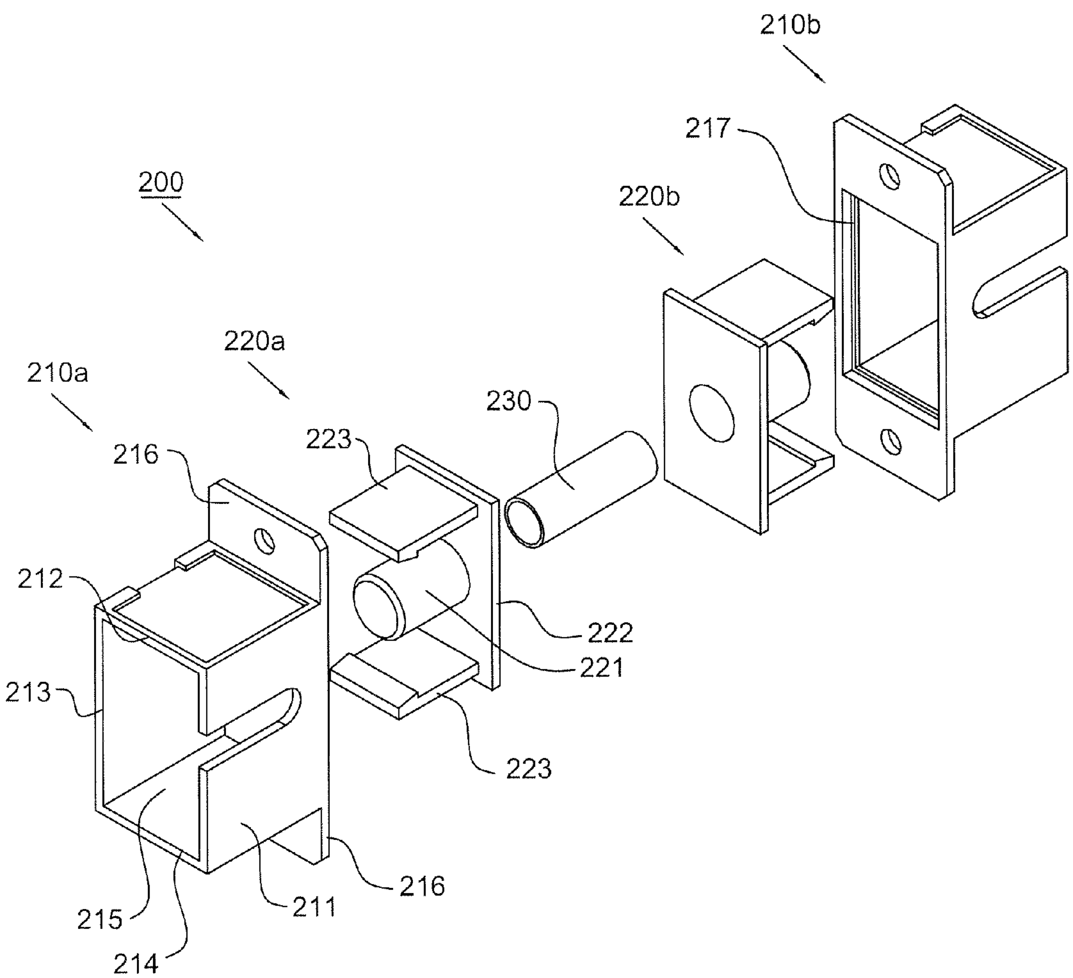
FIG. 2 is an exploded view of a conventional SC type optical fiber adapter.
Figure 3A:
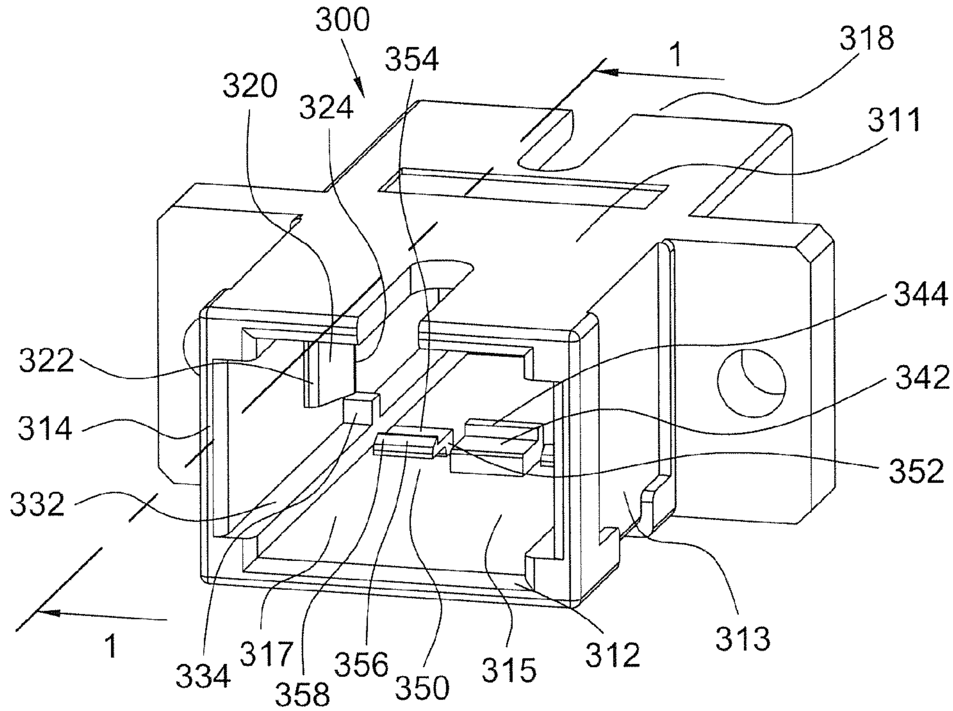
FIGS. 3*a* to 3*d* are different perspective views of the main body of the optical fiber adapter of the present disclosure.
Figure 3B:
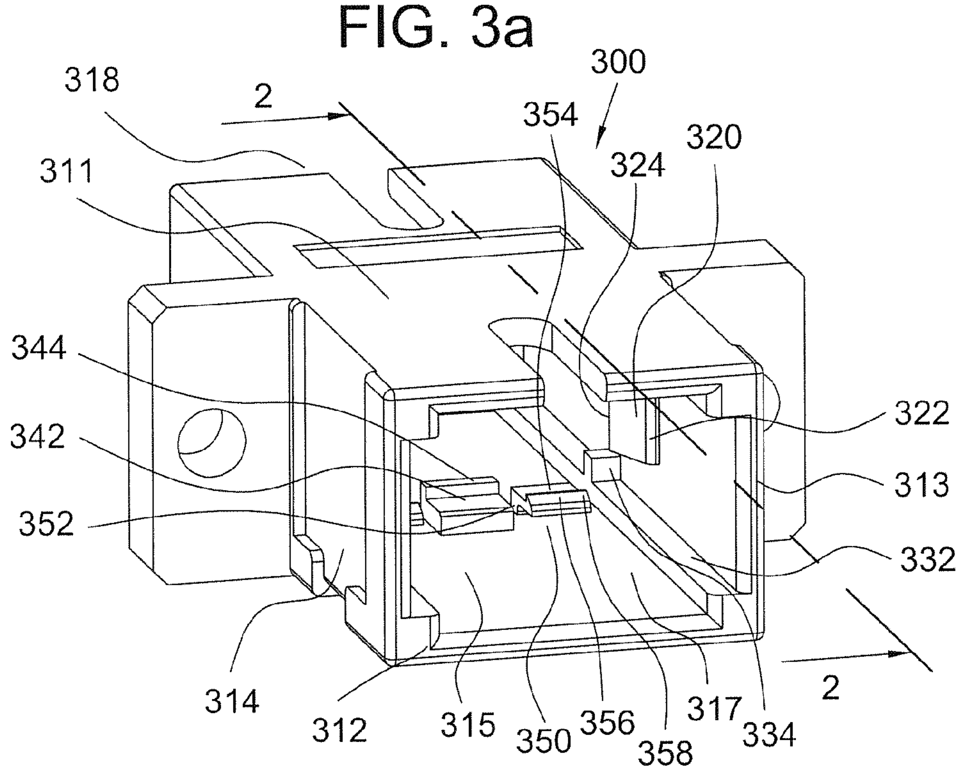
Figure 3C:
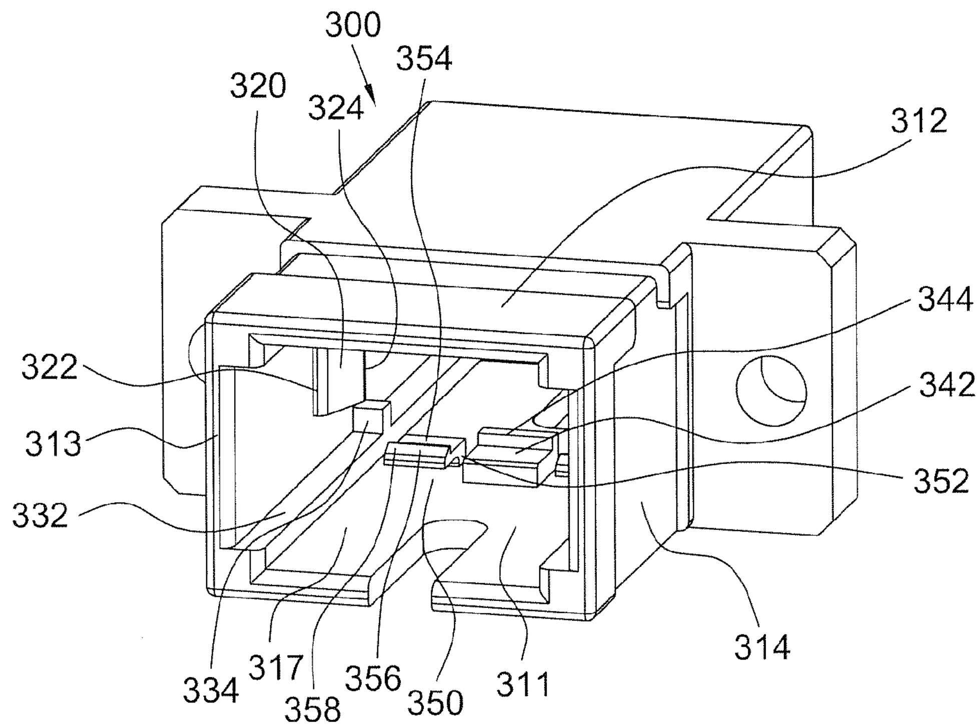
Figure 3D:
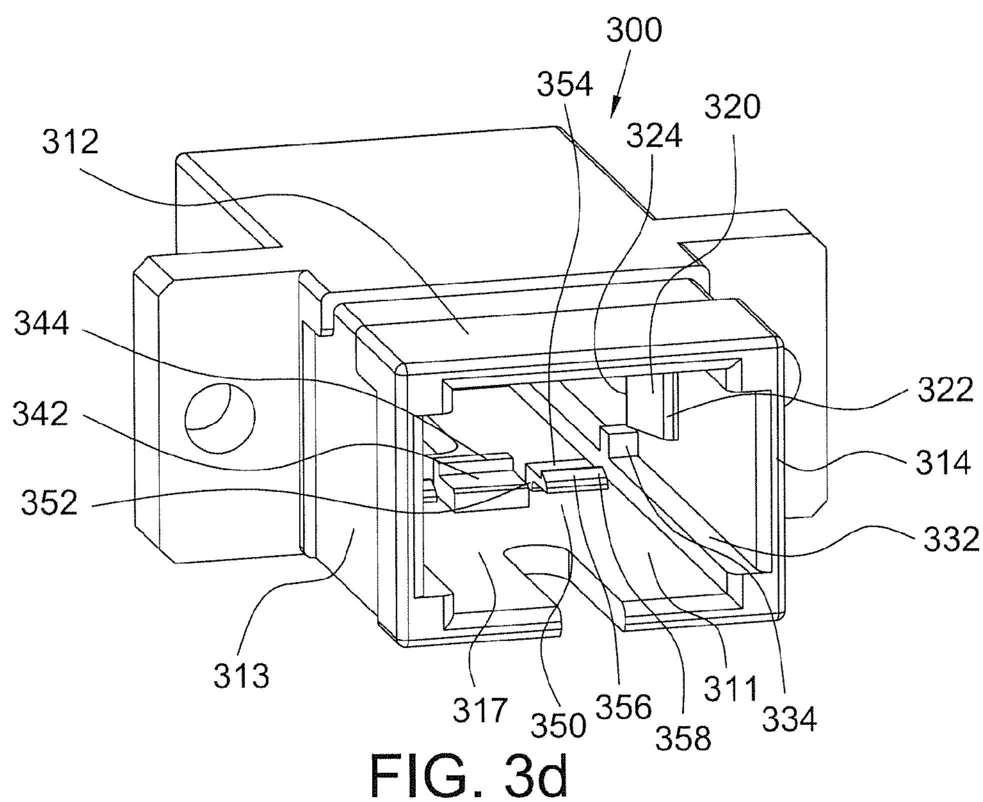
Figure 3E:
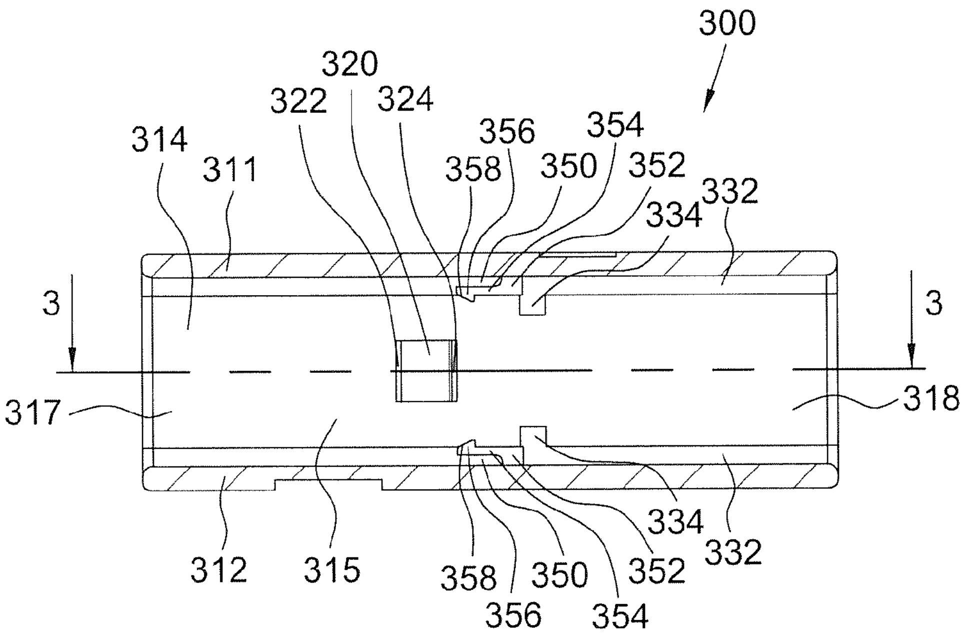
FIG. 3*e* is a cross-sectional view of the main body taken along line 1-1 in FIG. 3*a*.
Figure 3F:
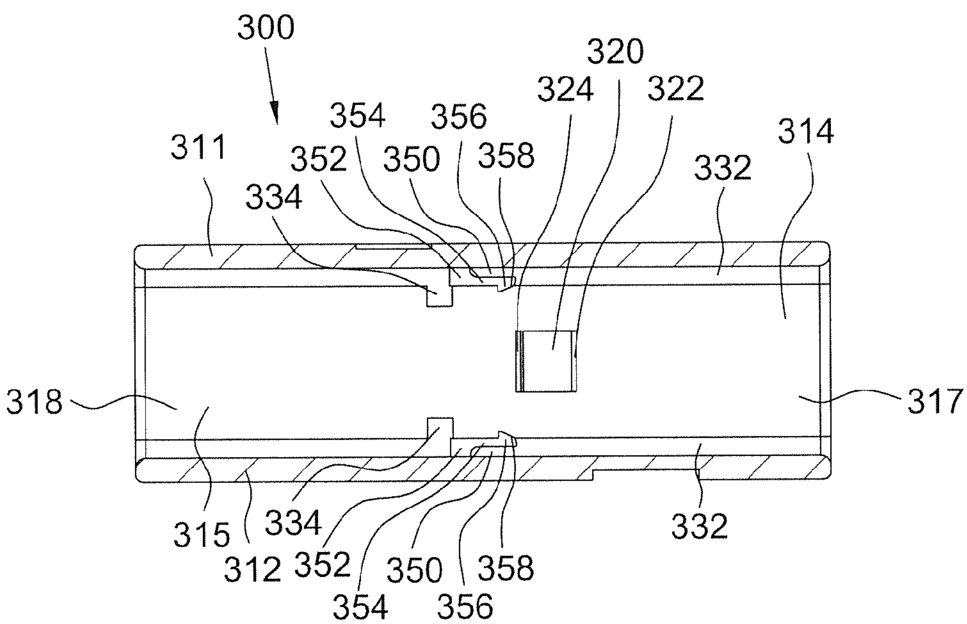
FIG. 3*f* is a cross-sectional view of the main body taken along line 2-2 in FIG. 3*b*.
Figure 3G:
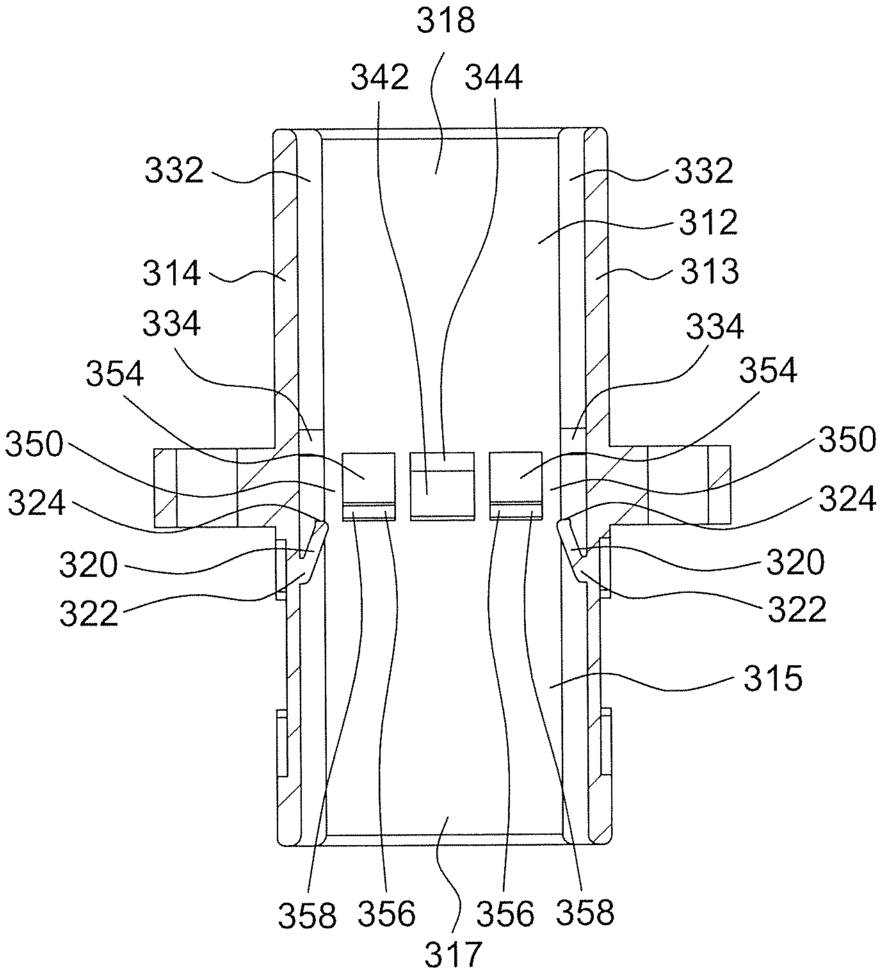
FIG. 3*g* is a cross-sectional view of the main body taken along line 3-3 in FIG. 3*e*.
Figure 4A:
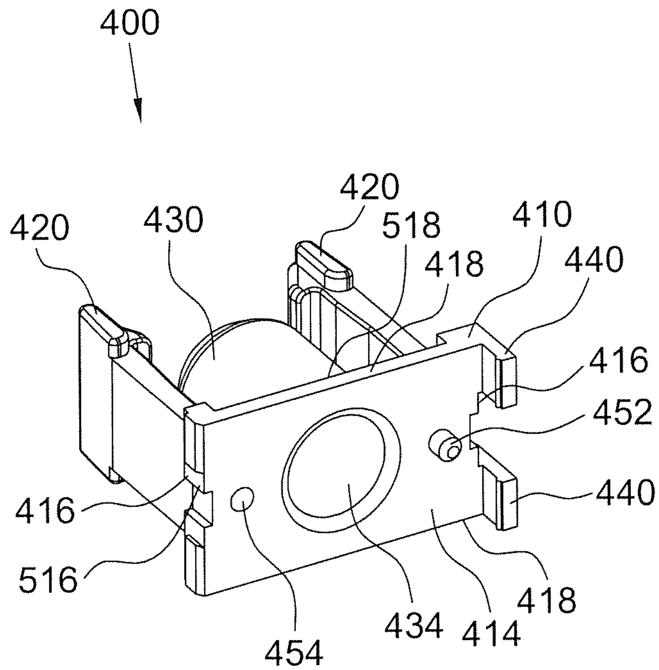
FIGS. 4*a* to 4*c* are different perspective views of the inner housing of the optical fiber adapter of the present disclosure.
Figure 4B:
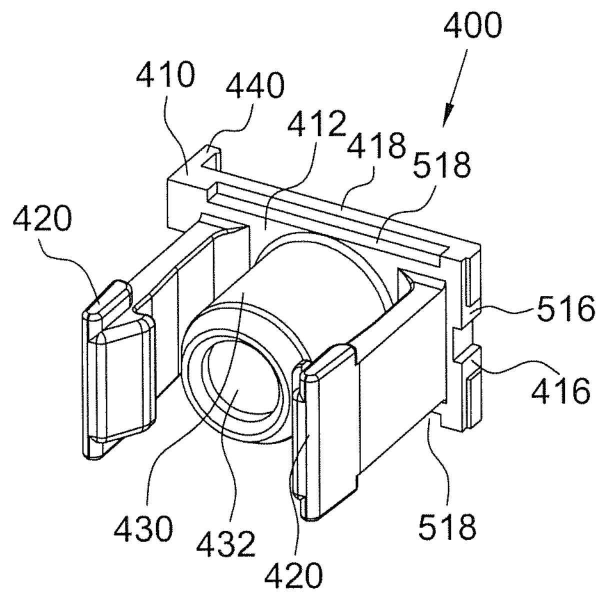
Figure 4C:
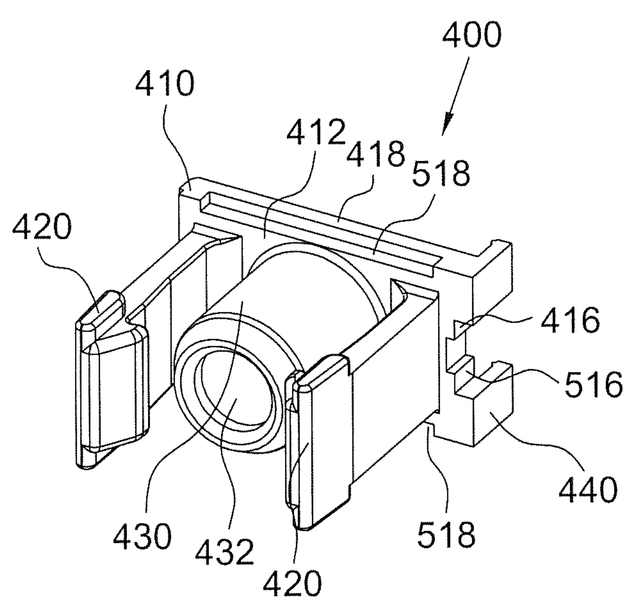
Figure 4D:
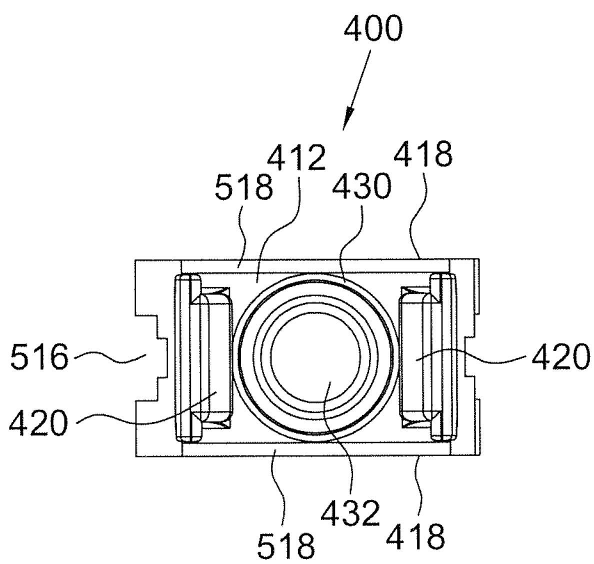
FIG. 4*d* is a front view of the inner housing of the optical fiber adapter of the present disclosure.
Figure 4E:
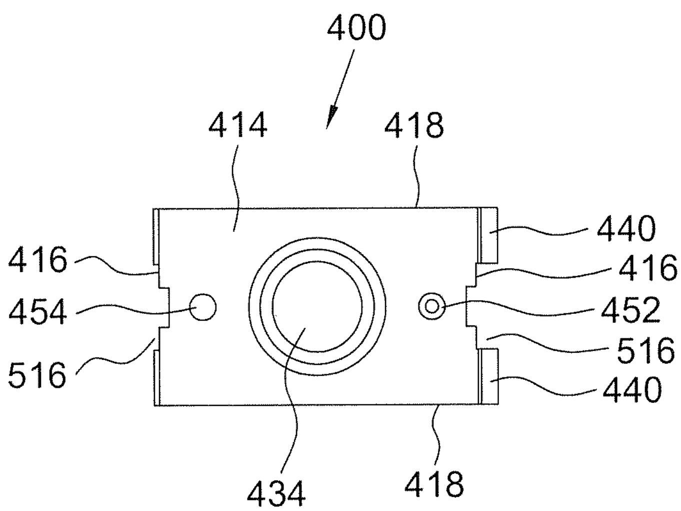
FIG. 4*e* is a rear view of the inner housing of the optical fiber adapter of the present disclosure.

Referring to FIGS. 3a to 3g, the optical fiber adapter according to the present disclosure includes a unitary molded plastic main body 300. The main body 300 is substantially rectangular and has an passage 315 defined by a top wall 311, a bottom wall 312, a right wall 313 and a left wall 314, wherein the top wall 311 faces the bottom wall 312 and connects with the right wall 313 and left wall 314. The passage 315 has opposing first opening 317 and second opening 318 in an axial direction through which an optical fiber connector may be inserted into the passage 315. Two elastic plates 320 are formed at the right wall 313 and left wall 314 respectively, wherein one extends from the right wall 313 toward the left wall 314 and the second opening 318, and the other extends from the left wall 314 toward the right wall 313 and the second opening 318. Specifically, the elastic plates 320 have roots 322 and rear ends 324, respectively. One of the elastic plates 320 extends from the root 322 fixed at the right wall 313 to the rear end 324 located away from the right wall 313. The other elastic plate 320 extends from the root 322 fixed at the left wall 314 to the rear end 324 located away from the left wall 314. A rectangular supporting-portion 332 is formed at each of the respective intersections of the top wall 311, bottom wall 312, right wall 313 and left wall 314. A stop block 334 is formed at each of the supporting portions 332. A platform 342 is formed at each of the top wall 311 and bottom wall 312. A rectangular stop-block 344 is formed at the each of the platforms 342. Two elastic plates 350 are formed at the top wall 311 and positioned at opposing sides of the platform 342 formed at the top wall 311, respectively. Two elastic plates 350 are formed at the bottom wall 312 and positioned at opposing sides of the platform 342 formed at the bottom wall 312, respectively. The elastic plates 350 have roots 352, arms 354 extending from the roots 352 toward the first opening 317, and stop blocks 356 formed at rear ends of the arms 354, respectively. The roots 352 are fixed at the top wall 311 and bottom wall 312, respectively. The arms 354 are located away from the top wall 311 and bottom wall 312 and therefore clear gaps are formed between the arms 354 and the top and bottom walls 311, 312. The stop blocks 356 are generally triangular and have inclined planes 358 facing the first opening 317.

Referring to FIGS. 4a to 4e, the optical fiber adapter of the present disclosure further includes a pair of inner housings 400. The two inner housings 400 are identical to each other in structure and are configured to place within the passage 315. Each of the inner housings 400 is provided with a generally rectangular flange 410 defined by a front surface 412, a back surface 414 opposing to the front surface 412, two longitudinal side-surfaces 416 and two transverse side-surfaces 418, wherein the longitudinal side-surfaces 416 connect with the front surface 412, back surface 414 and the transverse side-surfaces 418. A pair of hooks 420 extends from the front surface 412 of the flange 410. The flange 410 further includes a hollow cylinder 430 located between the two hooks 420. The cylinder 430 has an opening 432. Two indentations 518 proximate to the transverse side-surfaces 418 respectively are formed at the front surface 412 of the flange 410. At least one hook 440 extends from one of the longitudinal side-surfaces 416. An alignment pin 452 and a pin hole 454 are formed at the back surface 414 of the flange 410. An opening 434 in communication with the hollow cylinder 430 is formed at the back surface 414 of the flange 410 and located between the alignment pin 452 and pin hole 454. Furthermore, a breach 516 with a width slightly greater than that of the root 322 of the elastic plate 320 is formed in each of the longitudinal side-surfaces 416.

Figure 5:
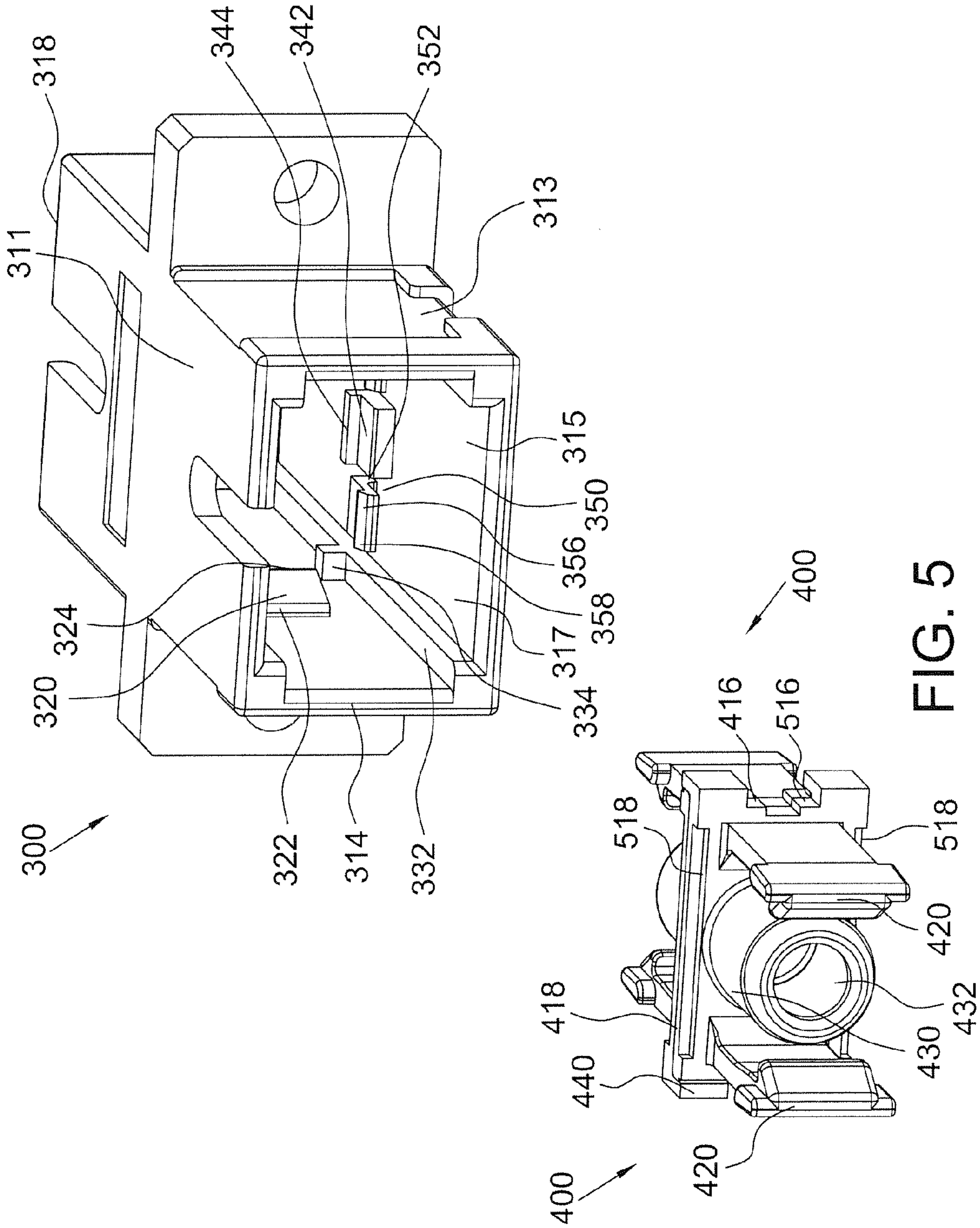
FIG. 5 illustrates the combined inner housings and the main body according to the present disclosure.
Figure 6A:
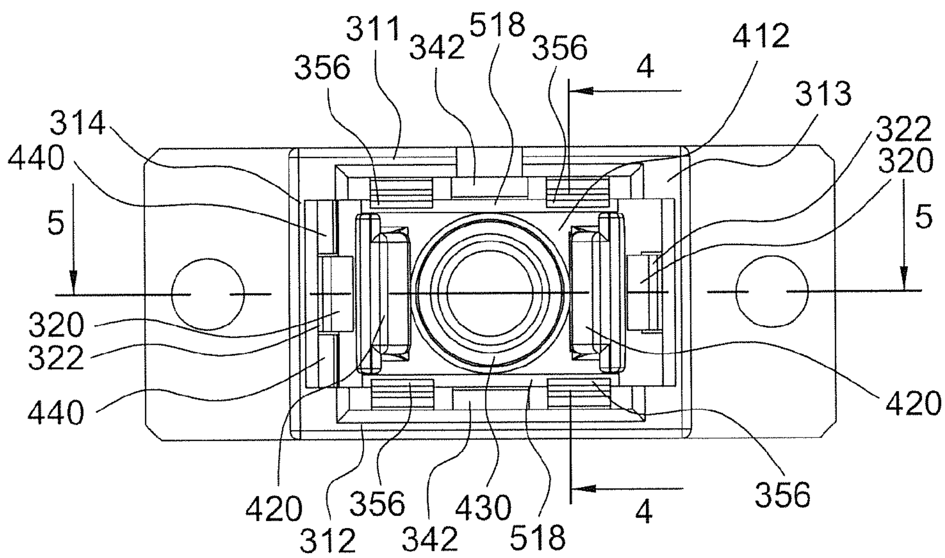
FIG. 6*a* is a front view of the optical fiber adapter of the present disclosure.
Figure 6B:
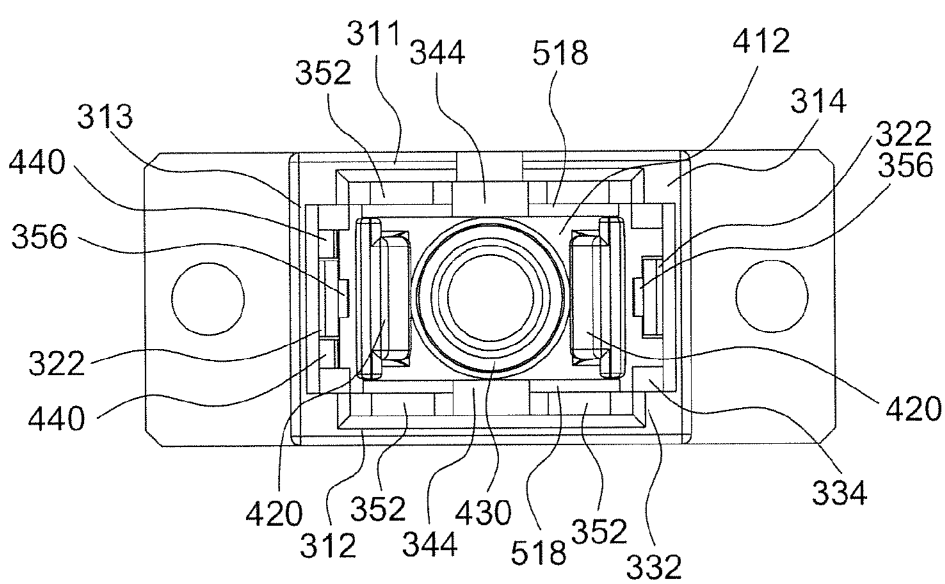
FIG. 6*b* is a rear view of the optical fiber adapter of the present disclosure.
Figure 7A:
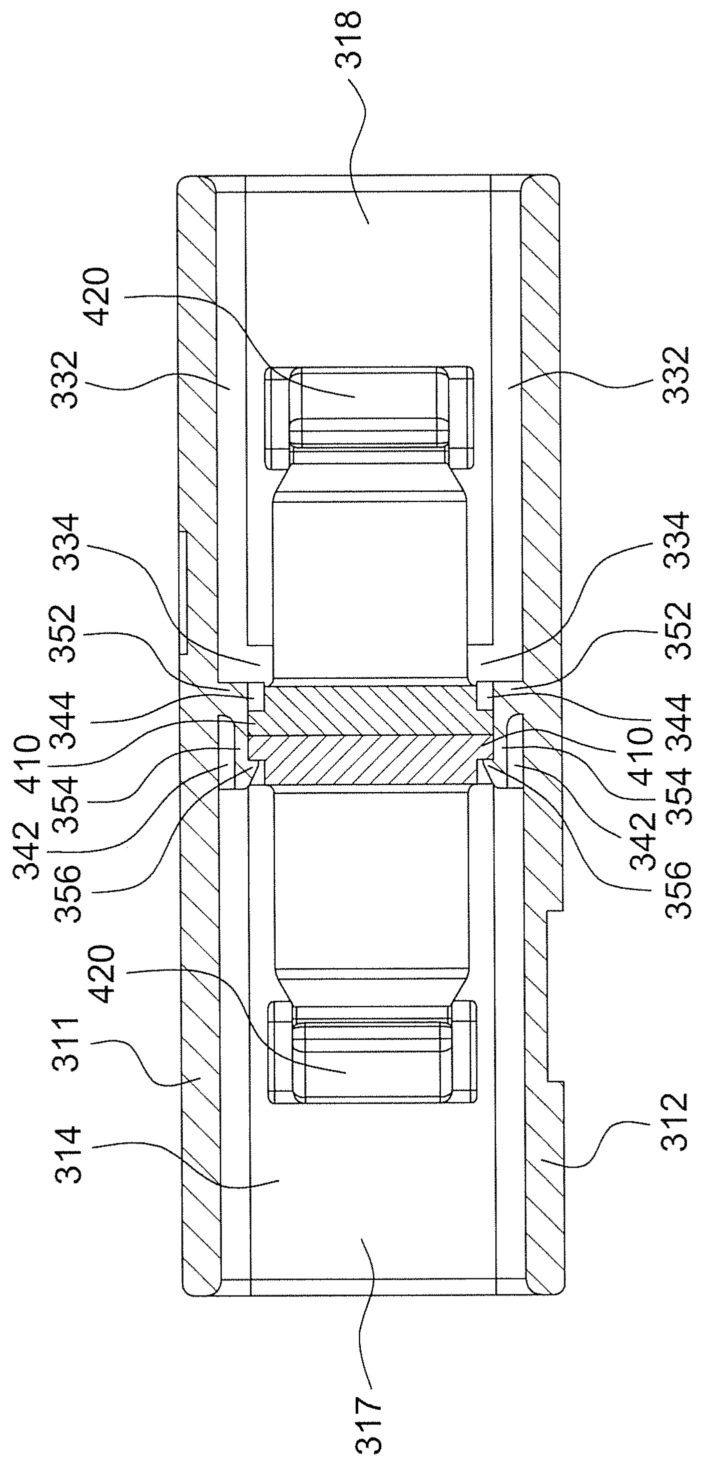
FIG. 7*a* is a cross-sectional view of the optical fiber adapter taken along line 4-4 in FIG. 6*a*.
Figure 7B:
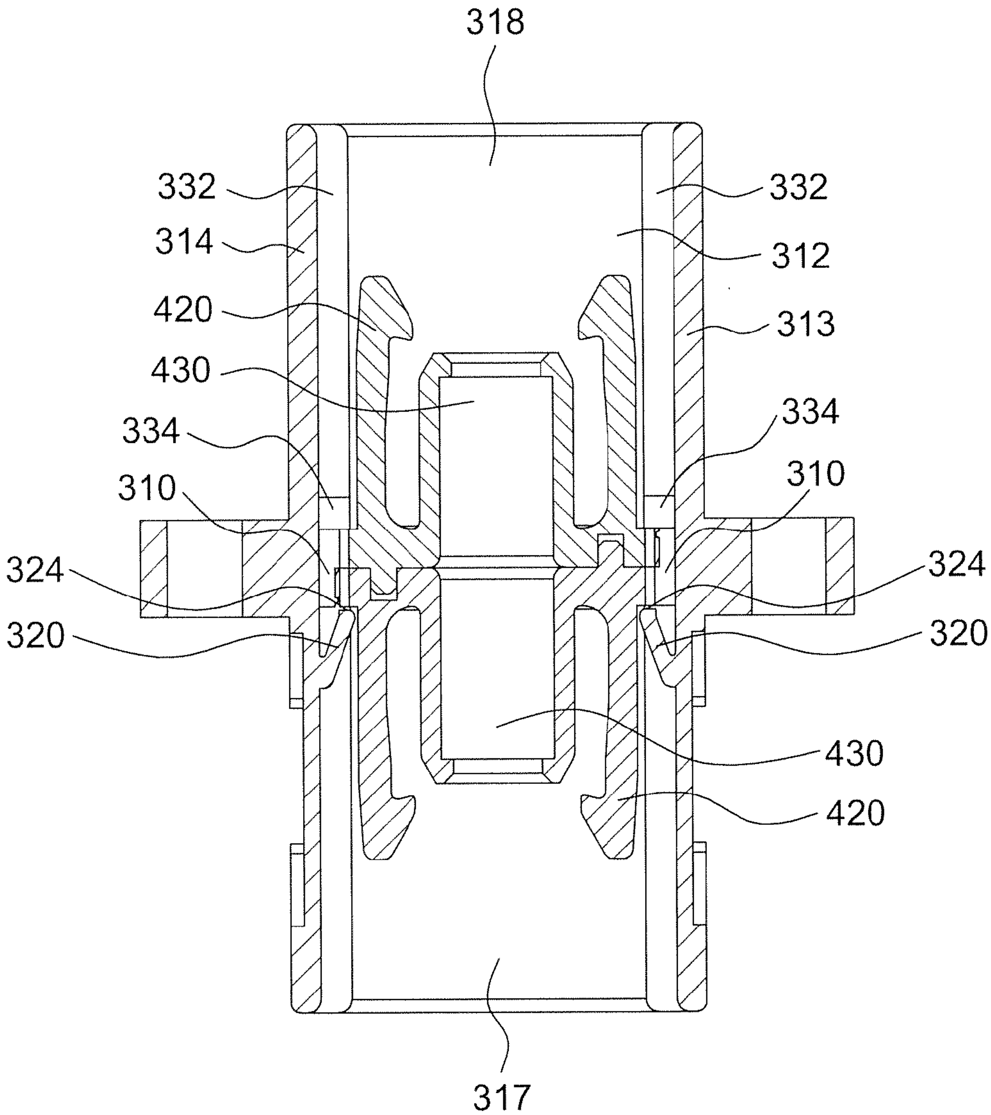

Referring to FIG. 5, when desiring to assemble the optical fiber adapter of the present disclosure, the two inner housings 400 are combined together by attaching the back surfaces 414 of the flanges 410 to each other in such a manner that the alignment pins 452 at the back surfaces 414 are inserted into the pin holes 454 at the opposing back surfaces 414 and the hooks 440 at the flanges 410 hook to the opposing flanges 410. Afterward, the combined inner housings 400 are inserted into the passage 315 through the first opening 317 thereof. When the inner housings 400 continue to be pushed into the passage 315, the transverse side-surfaces 418 of the flanges 410 of the inner housings 400 will slide on the supporting portions 332 and then confront the stop blocks 356 of the elastic plates 350, respectively. The longitudinal side-surfaces 416 of the flanges 410 of the inner housings 400 will confront the elastic plates 320, respectively. Since the elastic plates 350, 320 may be depressed down, the transverse and longitudinal side-surfaces 418, 416 of the flanges 410 of the inner housings 400 will press down the elastic plates 350, 320 and slide on the inclined planes 358 of the stop blocks 356 and the elastic plates 320, respectively.

Referring to FIGS. 6a, 6b, 7a and 7b, after the flanges 410 pass the stop blocks 356 and elastic plates 320, the elastic plates 350, 320 will move back to their original positions. If the inner housings 400 are tried to be further pushed toward the second opening 318, the stop blocks 334, 344 will then stop the flanges 410 from moving forward and the stop blocks 344 are received in the indentations 518 of the flange 410. If the inner housings 400 are tried to be pulled out from the first opening 317, the stop blocks 356 and elastic plates 320 will stop the flanges 410 from moving toward the first opening 317 thereby prevent the inner housings 400 from being pulled out of the passage 315 through the first opening 317. Therefore, when the inner housings 400 are located in position in the passage 315, the edges of the two flanges 410 will be positioned between the stop blocks 334, 344 and the stop blocks 356, elastic plates 320. By this arrangement, the movement of the flanges 410 within the passage 315 in the axial direction will be restricted.

According to the optical fiber adapter of the present disclosure, the breaches 516 formed in the longitudinal side-surfaces 416 are sized to allow the passing of the roots 322 of the elastic plates 320 respectively when the inner housings 400 are inserted into the passage 315 of the main body 300. Furthermore, the supporting portions 332, arms 354 and platforms 342 are in contact with the flanges 410 to support the inner housings 400 when the inner housings 400 are located in position in the passage 315.

According to the optical fiber adapter of the present disclosure, the main body 300 is integrally formed. Therefore, there is no welding line is present on the optical fiber adapter. Furthermore, the optical fiber adapter of the present disclosure has fewer parts and therefore is simpler and easier to assemble.

Although the present disclose has been explained in detailed with SC type optical fiber adapter, it will be appreciated that the optical fiber adapter of the present disclosure may include other types of adapters. For example, the optical fiber adapter of the present disclosure may be the LC type optical fiber adapter.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, the optical fiber adapter comprising:

a main body having a passage defined by a first wall, a second wall, a third wall and a fourth wall, the first wall facing the third wall and connecting with the second and fourth walls, wherein the passage has opposing first and second openings in an axial direction to allow the two optical fiber connectors to insert into the passage to mate with each other;

a first stop block positioned on the first wall;

a second stop block positioned on the third wall;

a first elastic plate positioned within the passage;

a second elastic plate positioned within the passage; and a pair of inner housings positioned within the passage, each the inner housing comprising:

a flange having opposing front and back surfaces; and a hollow cylinder extending from the front surface of the flange, wherein the flanges of the two inner housings are attached to each other and are positioned between the first stop block and first elastic plate, and between the second stop block and second elastic plate, and wherein the first, second stop blocks, and the first, second elastic plates are positioned to restrict a movement of the flanges in the axial direction, wherein the first opening is further configured for the two inner housings to pass through the first opening to insert into the passage.

2. The optical fiber adapter as claimed in claim 1, wherein the first elastic plate has a first root and a first rear end, the first root is fixed on the second wall, the first rear end is located away from the second wall, the first elastic plate extends from the first root toward the second opening of the passage to the first rear end.

3. The optical fiber adapter as claimed in claim 2, wherein the second elastic plate has a second root and a second rear end, the second root is fixed on the fourth wall, the second rear end is located away from the fourth wall, the second elastic plate extends from the second root toward the second opening of the passage to the second rear end.

4. The optical fiber adapter as claimed in claim 1, wherein the first elastic plate comprises:

a first root fixed on the first wall;

a first arm extending from the first root toward the first opening of the passage, wherein the first arm is located away from the first wall; and a third stop block positioned on the first arm, wherein the third stop block is configured to stop the flanges from moving toward the first opening of the passage.

5. The optical fiber adapter as claimed in claim 4, wherein the second elastic plate comprises:

a second root fixed on the third wall;

a second arm extending from the second root toward the first opening of the passage, wherein the second arm is located away from the third wall; and a fourth stop block positioned on the second arm, wherein the fourth stop block is configured to stop the flanges from moving toward the first opening of the passage.

6. The optical fiber adapter as claimed in claim 1, wherein the main body is integrally formed.

7. The optical fiber adapter as claimed in claim 3, wherein each of the flanges has two side surfaces connects with the front and back surfaces, a breach is formed at each of the side surfaces, the breaches are configured to allow the passing of the first and second roots, respectively.

8. The optical fiber adapter as claimed in claim 5, wherein each of the third and fourth stop blocks has an inclined plane facing the first opening of the passage.

9. The optical fiber adapter as claimed in claim 1, wherein each of the inner housings has a hook extending from the flange to hook on to the flange of the other inner housing.

10. A method of assembling an optical fiber adapter, comprising:

providing a main body having a passage defined by a first wall, a second wall, a third wall and a fourth wall, the first wall facing the third wall and connecting with the second and fourth walls, the passage having opposing first and second openings in an axial direction to allow the two optical fiber connectors to insert into the passage to mate with each other, wherein a first stop block is positioned on the first wall, a second stop block is positioned on the third wall, a first elastic plate and a second elastic plate are positioned within the passage;

providing a pair of inner housings, each of the inner housings has a hollow cylinder extending from a flange;

inserting the two inner housings into the passage of the main body through the first opening; and positioning the flanges of the two inner housings between the first stop block and first elastic plate, and between the second stop block and second elastic plate.

11. The method as claimed in claim 10, further comprising:

sliding the flanges of the two inner housings on the first and second elastic plates.

12. The method as claimed in claim 10, wherein the first elastic plate has a first root and a first rear end, the first root is fixed on the second wall, the first rear end is located away from the second wall, the first elastic plate extends from the first root toward the second opening of the passage to the first rear end.

13. The method as claimed in claim 12, wherein the second elastic plate has a second root and a second rear end, the second root is fixed on the fourth wall, the second rear end is located away from the fourth wall, the second elastic plate extends from the second root toward the second opening of the passage to the second rear end.

14. The method as claimed in claim 10, wherein the first elastic plate includes a first root, a first arm and a third stop block, the first root is fixed on the first wall, the first arm extends from the first root toward the first opening of the passage, the first arm is located away from the first wall, the third stop block is positioned on the first arm, the method further comprising:

sliding the flanges of the two inner housings on an inclined plane of the third stop block.

* * * * *